United States Patent

[11] 3,620,233

[72] Inventors: Oswald Busse; Hugo Klesper, both of Michelbach, Germany
[21] Appl. No.: 53,109
[22] Filed: July 8, 1970
[45] Patented: Nov. 16, 1971
[73] Assignee: Passavant-Werke Hutte, Germany
[32] Priority: July 11, 1969
[33] Germany
[31] G 69 27 408.4

[54] FILTER PRESS WITH CLEANING APPARATUS
14 Claims, 3 Drawing Figs.
[52] U.S. Cl. .................................. 134/57 R, 134/104, 134/167 R, 134/172
[51] Int. Cl. .................................. B08b 3/02
[50] Field of Search .................................. 134/57 R, 104, 167 R, 168 R, 172–175, 198–199, 177–178, 180–181

[56] References Cited
UNITED STATES PATENTS
1,080,704  12/1913  Lilleberg .................. 134/172
2,194,071  3/1940   Hine ....................... 134/172 UX
2,726,666  12/1955  Oxford .................... 134/172 X FOREIGN PATENTS
560,909    10/1957  Belgium ................... 134/172
384,418    12/1932  Great Britain ............. 134/172
6,516,120  12/1965  Netherlands ............... 134/172
70,811     8/1946   Norway .................... 134/172

OTHER REFERENCES
Leaf Filter," Chemical Engineering," p. 179, 9/28/64

Primary Examiner—Robert L. Bleutge
Attorney—Larson, Taylor and Hinds

ABSTRACT: A cleaning device for a filter press. A spray tube is mounted on a carriage beneath the filter plates, the carriage being movable lengthwise of the filter press and including a device to lift and lower the spray tube between a lowered position and a raised position, the spraying tube being located in the raised position between filter plates to clean the same. The carriage may ride along the side bars of the filter press or it may ride along the top of a cake-catching basin located beneath the filter plates.

INVENTORS
OSWALD BUSSE
HUGO KLESPER

INVENTORS
OSWALD BUSSE
HUGO KLESPER

BY Larson, Taylor and Hinds

ATTORNEYS

FILTER PRESS WITH CLEANING APPARATUS

BACKGROUND OF THE INVENTION

This invention relates to filter presses, and in particular, it relates to a new and improved cleaning apparatus for a filter press.

Devices have been provided heretofore for cleaning the filter plates of a filter press. In filter presses of the present type, the filter plates are normally supported on upper central lengthwise supporting members. The plates are normally suspended from such supporting members and are capable of lengthwise movement therealong. Known cleaning devices have included a carriage which travels along the upper supporting members. Such previous cleaning devices have included a swinging arm including a piston drive for raising and lowering a spray tube. In operating this previous cleaning device, the filter press is open, the filter cakes are removed and the spray tube is swung to the side of the filter press and into a space between two filter plates. While between said filter plates, the spray tube is moved up and down to clean the plates. After the filter plates are cleaned, the spray tube is swung out from between the filter plates. The plates are then moved together thereby opening a space between adjacent filter plates. The carriage of the cleaning device is then moved to clean the space between the said adjacent filter plates.

This previously known device suffers from the disadvantages that it is quite complicated because it requires numerous manipulations. The time required to operate this device is long and thus reduces the overall economy of the filter press. In addition, the mechanism required to carry out the swinging movements of this cleaning device are quite complicated. Therefore, the device is quite susceptible to failures, and the detrimental effects of such failures are multiplied when an apparatus is used in the waste water section because of the rough operation and relatively high forces which are present in such an environment. Further, in such known cleaning devices, it is virtually impossible to provide a center holding means for the spray tube. Rather, the mounting for the spray tube must be located at the side of the filter press. This fact, together with the fact that the arrangement includes a long protruding swinging element, results in a very unstable arrangement subject to distortions.

The disadvantages of the said previous cleaning device are partially overcome by another known filter press cleaning device in which the spray tube is mounted on a pair of vertical arms suspended on the supporting frame of the filter plates and including a movable carriage and means for moving the spray tube vertically from above down into the space between adjacent filter plates and raising the same. However, this arrangement has its own disadvantages. Necessary structure such as side bars, lateral spring wedges, etc. are located on the sides of the filter press. Thus, it requires a somewhat complicated arrangement to provide said supporting arms and also to provide a space for connection between the supporting arms and the spray tube such that the spray tube can pass freely down between the filter plates. Further, this requires that much structure in addition to the actual spray tube also pass down between the filter plates. However, considering the economy and the structural requirements in the construction of a filter press, the space between these filter plates must be kept as small as possible.

Thus, there exists a need for a new and improved cleaning apparatus for a filter press, which overcomes disadvantages of cleaning devices known heretofore.

SUMMARY OF THE INVENTION

Thus, it is a purpose of this invention to provide a new and improved cleaning apparatus for a filter press which overcomes the disadvantages of the prior art.

This purpose is achieved in accordance with the present invention by providing an arrangement wherein the spray tube is mounted on a carriage located beneath the filter plates, the carriage is movable beneath the filter plates and the arrangement includes means for raising the spray tube into cleaning positions between filter plates and then lowering the spray tube to a level beneath the filter plates. Such means for raising and lowering the spray tube is also provided on the carriage.

Many different arrangements may be provided for moving the carriage in the lengthwise direction beneath the filter press. In one preferred arrangement, the carriage may be mounted on the upper opening of a catch basin located beneath the filter press and provided for the purpose of catching filter cakes formed by the filtering process. In this preferred arrangement, various switches may be provided along the upper edge of the basin and operated by contact with the carriage whereby vertical movement of the spray tube and the introduction of spraying liquid can be controlled automatically. Also, the carriage may include a laterally extending arm for moving the carriage manually. In this arrangement the arm may have formed thereon the necessary switches for raising and lowering the spray tube and for controlling the introduction of cleaning liquid.

In another embodiment of the invention, the carriage may be mounted directly on the side bars which extend along the side of the filter plates between the end walls thereof.

Various means may be provided for raising and lowering the spraying tube, and these may include, for example, a hydraulic cylinder, a set of telescopic, mechanically operated tubes of spindles, a pivoted lever arrangement, etc.

Thus, it is an object of this invention to provide a new and improved cleaning device for a filter press.

It is another object of this invention to provide a filter press with a new and improved cleaning device which is located beneath the filter plates, movable lengthwise of the filter press, and includes means for raising the spraying tube to a position between filter plates and for lowering the spraying tube to a position beneath the filter plates.

It is another object of this invention to provide a filter press having a new and improved cleaning arrangement located beneath the filter plates and adapted to be operated automatically.

Other objects and advantages of the present invention will become apparent from the detailed description to follow, together with the accompanying drawings.

BRIEF DESCRIPTION OF THE DRAWINGS

There follows a detailed description of preferred embodiments of the invention which are to be read together with the accompanying drawings which are provided solely for purposes of illustration.

DETAILED DESCRIPTION OF THE PREFERRED EMBODIMENTS

Figure 1:
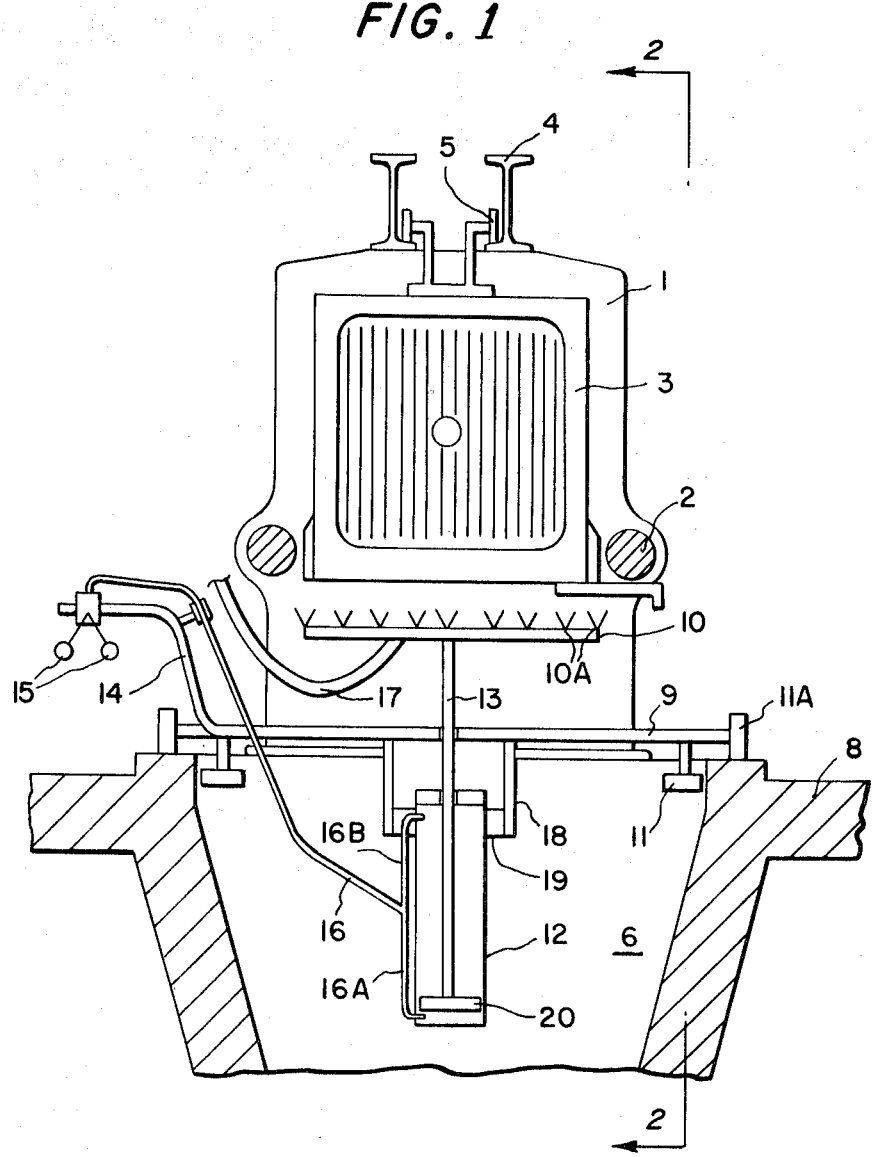
FIG. 1 is a cross-sectional view of a filter press including the features of the present invention.
Figure 2:
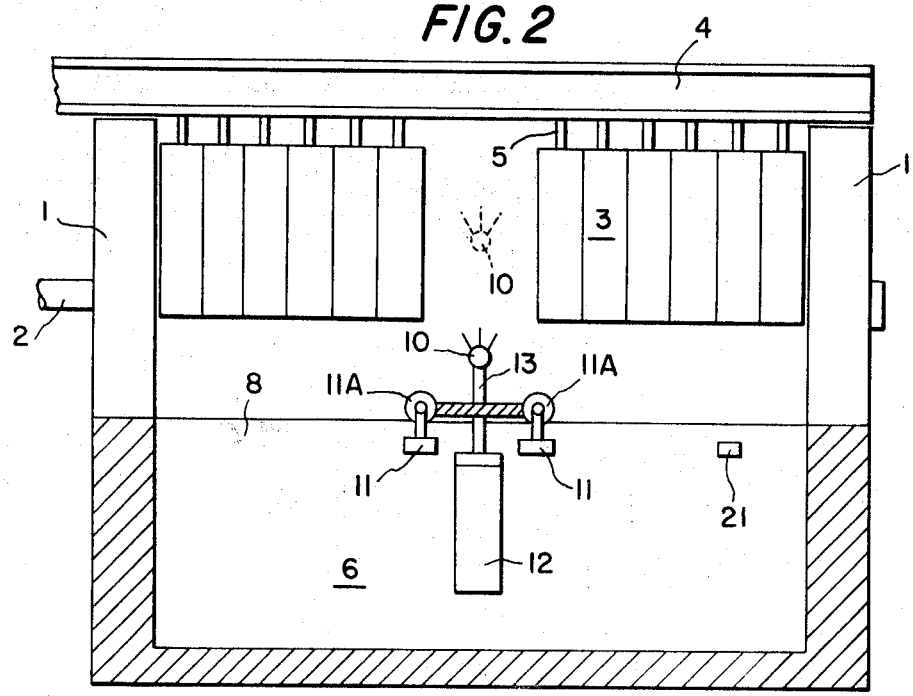
FIG. 2 is a longitudinal sectional view taken along line 2—2 of FIG. 1.
Figure 3:
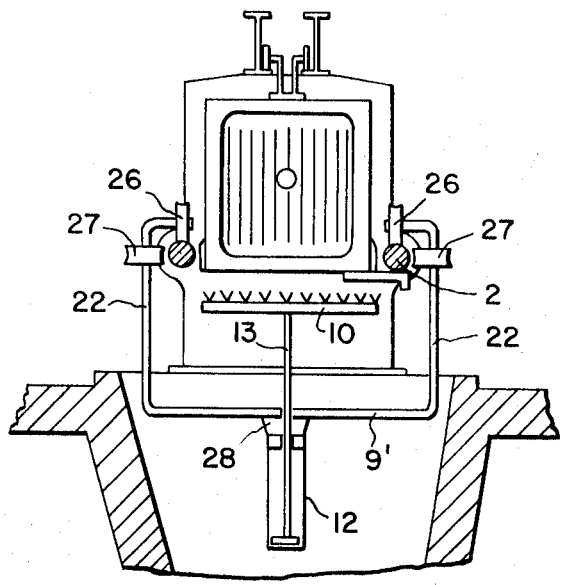
FIG. 3 is a cross-sectional view similar to FIG. 1 and showing a modification of the invention.

Referring now to FIGS. 1 through 3, like elements are represented by like numerals throughout the several views.

In a first embodiment of the invention, as shown in FIGS. 1 and 2, the filter press comprises a pair of end walls 1. As shown in FIG. 2, the left end wall is movable while the right end wall is fixed. The end walls are operatively connected together for relative movement towards and away from each other by means of side bars 2. For example, in the arrangement as shown in the drawings, the side bars 2 extend through both end walls and a suitable means would be provided for moving the left-hand end wall towards the right, sliding along the side bars 2 for compressing between the end walls the filer plates 3. Support members comprising a pair of I-beam rails 4 extend lengthwise along the top of the filter press and the filter plates 3 are suspended therefrom for lengthwise movement therealong by means of suspension devices including rollers 5.

A basin 6 is located beneath the filter press for receiving the filter cakes which fall from beneath the filter plates 3 when they are opened up after a filtering process. This basin 6 includes an upper rim 8 extending in the lengthwise direction of the basin 6.

Beneath the filter plates 3 there is provided a carriage 9 having a first set of rolling support wheels 11A arranged to ride along the upper rim 8 of the basin 6. This carriage also includes guide rollers 11 which engage the inside of the basin 6 for guiding the carriage 9 as it moves in the said lengthwise direction. This carriage 9 carries the cleaning device itself which includes a pipe 10 extending horizontally transversely of the said lengthwise direction. This pipe 10 includes a plurality of spray openings 10A. A suitable means such as fluid line 17 supplies cleaning liquid to the pipe 10. This pipe is supported on a piston rod 13 which extends downwardly therefrom and includes a piston head 20 at its lower end which is mounted in a cylinder 12. This cylinder 12 may be connected to the carriage 9 by any suitable means. For example, in the embodiments of FIGS. 1 and 2 a cylindrical member 18 extends downwardly from the carriage 9 and includes a spider member 19 for connecting the cylinder 12 to the member 18. Hydraulic fluid through line 16 is directed to either line 16A beneath the piston head 20 to raise the rod 13 or to line 16B above the piston head 20 to lower the rod 13. In this manner, the spray pipe 10 may be raised to an elevated position at which the pipe 10 is located between spaced apart filter plates 3 (as shown in dotted lines in FIG. 2) or to a lowered position as shown in solid lines in FIGS. 1 and 2.

The carriage 9 may also include a suitable means such as swinging arm 14 extending outwardly from the carriage and positioned to be conveniently engaged by an operator for manually moving the carriage 9. A suitable switch means including levers 15 may be mounted on the arm 14 for controlling the flow of hydraulic fluid to the line 16, and hence controlling the raising and lowering movement of the pipe 10, and also for controlling the flow of cleaning liquid to line 17 and hence to spray pipe 10.

As an alternative to elements 14 and 15, the apparatus may be operated automatically by providing a plurality of contacts switches 21, one of which is shown in FIG. 2, along the wall of the basin 6 and positioned to be engaged at appropriate times by the rollers 11 of the carriage 9. Of course the switches 21 could also be located at other locations such as along the top of rim 8 to be engaged by the rollers 11A.

In operation, after a filtering process has been completed and the filtering cakes have been dropped into the basin 6, the carriage 9 is moved to one end of the filter press and the two end plates are separated. Fluid is introduced through line 16 to 16A, thereby raising the piston rod 13 such that the spray head 10 extends into the space between the filter plates. Fluid is supplied through line 17 and sprayed through openings 10A as the pipe 10 rises and subsequently falls in the space between the filter plates. After the two surfaces facing this space have been cleaned and the spray pipe 10 has been lowered, the second filter plate is moved to close the space, thereby opening the space between the second and third filter plates. The carriage 9 is then moved until the pipe 10 is located beneath this new space. The pipe 10 is raised to clean the surfaces facing this space. This procedure is continued until the carriage has reached the opposite end of the filter press and has cleaned the space between the last two filter plates.

FIG. 3 shows a modification of the invention. In this embodiment, a carriage 9' differs from the carriage 9 of FIGS. 1 and 2 in that the rollers 11 and 11A have been eliminated. In this case, there is no dependence on the basin 6 for support. The carriage 9 includes upwardly extending arms 22 which include at their upper ends support wheels 26 and guide wheels 27 which engage the top and side of the side bars 2 for support and guidance, respectively. Also, the elements 18 and 19 have been replaced by a bracket 28. In other respects, FIG. 3 is identical to FIGS. 1 and 2, and hence many details have been omitted.

The invention is capable of numerous further modifications and variations. For example, a suitable braking device may be provided in either embodiment for positively stopping the carriage and locking the same at each actual cleaning position, thereby avoiding unintentional movement of the carriage and thus avoiding contact of the spray pipe with the sensitive filter plates which they are cleaning. Also, the hydraulic cylinder lifting device 12 can be replaced by other suitable means such as a telescopic tubular arrangement or a set of pivoted levers, one of which extends outwardly to the side of the apparatus to be engaged by the operator, and the other of which engages the pipe 13 for raising the same upwardly.

Although the invention has been described in considerable detail with respect to a preferred embodiment thereof, it will be apparent that the invention is capable of numerous modifications and variations apparent to those skilled in the art without departing from the spirit and scope of the invention.

We claim:

1. A cleaning apparatus for a filter press of the type having a plurality of filter plates, comprising, a spraying means for spraying washing liquid onto the filter plates, said spraying means being located beneath said filter plates, and a lifting device also located beneath the filter plates for raising and lowering the spraying means at least between a lower position beneath the plates and a raised position between the filter plates for spraying the surface of the filter plates to be cleaned.

2. An apparatus according to claim 1, wherein said filter plates are arranged side-by-side along a lengthwise direction, and said spraying means is mounted for movement along said lengthwise direction beneath the filter plates.

3. An apparatus according to claim 2, including a carriage mounted beneath the filter plates and movable in said lengthwise direction, the said spraying means and the said lifting device being mounted on the carriage for lengthwise movement therewith.

4. An apparatus according to claim 3, including a basin beneath the filter press for catching filter cakes released from the filter press, and wherein said carriage is guided among said basin for movement in said lengthwise direction.

5. An apparatus according to claim 4, in which the rim of the upper opening of said basin is designed as a track for receiving the said carriage for lengthwise movement therealong.

6. An apparatus according to claim 5, in which said carriage includes first rolling means for engaging said track of the basin for movement therealong and second rolling means engaging the inside of the basin adjacent said track for guiding the said carriage in said lengthwise movement.

7. An apparatus according to claim 4, including switching means mounted on said basin in positions to be engaged by said carriage as the carriage moves along said basing for controlling the operation of said lifting device.

8. An apparatus according to claim 3, wherein said filter press includes a pair of side bars extending in said lengthwise direction on each side of said filter plates, and wherein said carriage includes means engaging said bars such that the weight of the carriage is supported by said bars as the carriage moves in said lengthwise direction.

9. An apparatus according to claim 8, including guide means on said carriage engaging said side bars for guiding the carriage as it moves along said lengthwise direction.

10. An apparatus according to claim 3, including a swinging arm attached to said carriage and extending out to the side of said carriage relative to said lengthwise direction, said arm being positioned to be engaged for manual movement of said carriage along said lengthwise direction.

11. An apparatus according to claim 10, including switching means on said swinging arm for controlling movement of the said lifting device and for controlling the introduction of cleaning liquid into said spraying means.

12. An apparatus according to claim 1, wherein said lifting device is a telescopic hydraulic cylinder.

13. An apparatus according to claim 1, wherein said lifting device comprises a set of telescoping spindles.

14. An apparatus according to claim 1, wherein said lifting device comprises a set of levers mounted for pivoting movement for raising and lowering the spraying means.

* * * * *